(12) United States Patent
Zhou et al.

(10) Patent No.: US 11,120,560 B2
(45) Date of Patent: Sep. 14, 2021

(54) SYSTEM AND METHOD FOR REAL-TIME LOCATION TRACKING OF A DRONE

(71) Applicant: SZ DJI TECHNOLOGY CO., LTD, Shenzhen (CN)

(72) Inventors: You Zhou, Shenzhen (CN); Zhenyu Zhu, Shenzhen (CN); Zhiyuan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/535,417

(22) Filed: Aug. 8, 2019

(65) Prior Publication Data
US 2019/0370983 A1 Dec. 5, 2019

Related U.S. Application Data

(63) Continuation of application No. PCT/CN2017/073197, filed on Feb. 10, 2017.

(51) Int. Cl.
| | |
|---|---|
| *G06T 7/246* | (2017.01) |
| *G06T 7/292* | (2017.01) |
| *G06T 7/73* | (2017.01) |
| *G06T 7/33* | (2017.01) |
| *G05D 1/00* | (2006.01) |

(Continued)

(52) U.S. Cl.
CPC ........... *G06T 7/248* (2017.01); *G05D 1/0094* (2013.01); *G05D 1/101* (2013.01); *G06T 7/292* (2017.01);
(Continued)

(58) Field of Classification Search
CPC ........... G06T 7/248; G06T 7/292; G06T 7/74; G06T 7/33; G06T 7/60;
(Continued)

(56) References Cited

U.S. PATENT DOCUMENTS

2008/0059065 A1* 3/2008 Strelow .................. G01S 19/14
701/448
2008/0088707 A1* 4/2008 Iwaki .................... G01S 13/931
348/208.1
(Continued)

FOREIGN PATENT DOCUMENTS

CN 104913776 A 9/2015

OTHER PUBLICATIONS

International Search Report from the State Intellectual Property Office of the P.R. China for International Application No. PCT/CN2017/073197, dated Oct. 27, 2017 (4 pages).

*Primary Examiner* — Michael E Teitelbaum
(74) *Attorney, Agent, or Firm* — Finnegan, Henderson, Farabow, Garrett & Dunner, LLP

(57) ABSTRACT

Methods, systems, and articles of manufacture configured to operate an aerial vehicle are provided. Various embodiments may be implemented with an aerial vehicle. In one exemplary implementation, a method of operating an aerial vehicle may include identifying, from image data, a set of predetermined features based on one or more invariant properties associated with the predetermined features. The predetermined features may be associated with predetermined physical locations. Based on the image locations of the predetermined features within the image data and the predetermined physical locations of the predetermined features, a system may be configured to determine at least one of a location and an orientation of the aerial vehicle. The disclosed embodiments may provide enhanced accuracy, usability, and robustness in tracking the location and orientation of an aerial vehicle under various operation conditions.

20 Claims, 13 Drawing Sheets

(51) Int. Cl.
*G05D 1/10* (2006.01)
*G06T 7/60* (2017.01)
*H04N 5/247* (2006.01)

(52) U.S. Cl.
CPC .................. *G06T 7/33* (2017.01); *G06T 7/60* (2013.01); *G06T 7/74* (2017.01); *H04N 5/247* (2013.01); *G06T 2207/10028* (2013.01); *G06T 2207/10032* (2013.01); *G06T 2207/30204* (2013.01); *G06T 2207/30252* (2013.01)

(58) Field of Classification Search
CPC . G06T 2207/10028; G06T 2207/10032; G06T 2207/30204; G06T 2207/30252; G05D 1/0094; G05D 1/101; H04N 5/247
See application file for complete search history.

(56) References Cited

U.S. PATENT DOCUMENTS

| | | |
|---|---|---|
| 2012/0105634 A1 | 5/2012 | Meidan et al. |
| 2012/0230592 A1* | 9/2012 | Iwamura ............... G06K 9/3283 382/201 |
| 2014/0064554 A1* | 3/2014 | Coulter ..................... G06T 7/33 382/103 |
| 2014/0210856 A1* | 7/2014 | Finn ................... G06K 9/00671 345/633 |
| 2015/0199556 A1* | 7/2015 | Qian ......................... G06T 7/74 382/215 |
| 2016/0173859 A1 | 6/2016 | Choi et al. |
| 2016/0327956 A1 | 11/2016 | Zhang et al. |
| 2017/0046840 A1* | 2/2017 | Chen .................... G06K 9/4604 |

* cited by examiner

SYSTEM AND METHOD FOR REAL-TIME LOCATION TRACKING OF A DRONE

CROSS-REFERENCE TO RELATED PATENT APPLICATIONS

This application is a continuation application of International Application No. PCT/CN2017/073197, filed Feb. 10, 2017, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

TECHNICAL FIELD

The present disclosure relates generally to physical location tracking and, more particularly, to systems and methods of real-time physical location tracking of a movable object based on image data.

BACKGROUND

Unmanned aerial vehicles ("UAV"), sometimes referred to as "drones," include pilotless aircraft of various sizes and configurations that can be remotely operated by a user or programmed for automated flight. UAVs can be used for many purposes and are often used in a wide variety of personal, commercial, and tactical applications. For instance, UAVs can be equipped with imaging equipment, such as cameras, video cameras, etc., for use in the surveillance, national defense, as well as in recreational activities. Further, UAVs can also be used as a transportation device, to transport objects (e.g., mails, merchandises, etc.).

Real-time location tracking of UAVs allows more efficient flight control of the UAVs and may also facilitate coordinated operations among multiple UAVs. As an illustrative example, a number of UAVs can be controlled to obtain images of a moving object from different angles, or to transport items between different locations. The flight paths of these UAVs can be controlled more precisely if their real-time locations are known. Moreover, the UAVs can be controlled to maintain a certain distance between each of the UAVs when they are airborne, to reduce the likelihood of midair collision.

One method of real-time location tracking uses a satellite navigation system, such as Global Positioning System (GPS), BeiDou, Galieo, etc. However, the accuracy of the tracking can be affected by the strength of the satellite signals, which are in turn affected by the geographical environment in which the UAVs are operated. For example, satellite signals are poor or non-existent in certain urban area, and real-time location tracking using satellite signals will not be feasible.

Another method of real-time location tracking relies on a multi-camera motion capture system, where fixed cameras on the ground capture images of the UAVs, and the locations of the UAVs are deduced based on the images and the locations of the fixed cameras. A multi-camera motion capture system does not solve the aforementioned problems of weak satellite signals though, because the UAVs may also move out of the views of the cameras. Moreover, the multi-camera motion capture system requires setting up of multiple cameras and a network for transmitting the cameras images for analysis, rendering the system bulky and not easily portable.

Accordingly, there is an existing need for a real-time physical location tracking of a movable object (such as an UAV) that is more robust and can operate across different geographical environments.

SUMMARY

The disclosed embodiments include methods, systems, articles of manufacture configured to operate an aerial vehicle. The disclosed embodiments can also be a part of an aerial vehicle. The techniques described in the disclosed embodiments may be used to determine at least one of a location and an orientation of the aerial vehicle based on image data captured by a camera installed with the aerial vehicle. The disclosed embodiments may identify, from the image data, a set of predetermined features based on one or more invariant properties associated with these features. These features are also associated with predetermined physical locations. Based on the image locations of these features within the image data, and the predetermined physical locations of these features, a system can determine at least one of a location and an orientation of the aerial vehicle. The disclosed embodiments provide enhanced accuracy, usability, and robustness in their ability to track the location and orientation of an aerial vehicle under various operation conditions.

In the disclosed embodiments, a system may acquire, from the one or more cameras, one or more images of a surface. The system may also identify one or more features with one or more invariant properties in the one or more images, and match the one or more identified features with a set of pre-determined features based on the one or more invariant properties, wherein each pre-determined feature is associated with a location. The system may also obtain location information of the one or more identified features, and determine at least one of a location and an orientation of the aerial vehicle based on the obtained location information of the one or more identified features.

In one aspect, the invariant properties according to the disclosed embodiments include affine invariant ratios or perspective invariant ratios determined based on locations of the set of predetermined features in the one or more images.

In another aspect, the disclosed embodiments may extract a query feature from the one or more images, acquire image locations of a set of neighboring features adjacent to the query feature in the one or more images, and determine a ratio based on geometric properties of the set of neighboring features. The disclosed embodiments may determine the location and the orientation of the aerial vehicle is determined based on a relationship between the determined ratio and the affine invariant ratios or the perspective invariant ratios associated with the predetermined set of features.

The disclosed embodiments also include methods, systems, articles of manufacture configured to generate reference data for determination of physical location and orientation of an aerial vehicle. In one aspect, the system may receive information of a set of reference features on a surface, and determine, based on the information, physical locations of the set of reference features. The system may also determine, based on the physical locations, neighboring features for each of the set of reference features. The system may also determine one or more invariant ratios associated with geometric properties of the neighboring features, and associate the one or more invariant ratios with the set of reference features and with the physical locations. The system may provide the set of reference features, the associated invariant ratios and the physical locations as reference data for determining a location and an orientation of an aerial vehicle.

In another aspect, the disclosed embodiments may determine whether the surface is uneven. Responsive to determining that the surface is uneven, the disclosed embodiments may generate, based on the information, a three-dimensional reference point cloud for the predetermined set of features. The disclosed embodiments may also associate a physical location with each point included in the three-dimensional reference point cloud, and provide the three-dimensional reference point cloud and the associated physical locations as the reference data.

In another aspect, the disclosed embodiments may also, responsive to determining that the surface is not uneven, determine whether the set of reference features are associated with a set of markers on the surface. The disclosed embodiments may also, responsive to determining that the set of reference features are not associated with a set of markers on the surface, perform image transformation to generate a second set of reference features, and determine the one or more invariant ratios based on the second set of reference features.

The techniques described in the disclosed embodiments may be performed by any apparatus, system, or article of manufacture, including a movable object such as a UAV, or a controller, or any other system configured to receive image data (including video data) and track target objects shown in the received images. Unlike prior tracking systems, the techniques described herein can more accurately track a location and an orientation of an aerial vehicle under various operating conditions.

It is to be understood that both the foregoing general description and the following detailed description are exemplary and explanatory only and are not restrictive of the disclosed embodiments as defined in the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosed embodiments provide improved techniques for real-time tracking of a movable object and, more particularly, systems and methods of tracking the physical location of a movable object in a three-dimensional space based on image data captured by the movable object. The resulting systems and methods provide enhanced accuracy, usability, and robustness in their ability to track a physical location of the movable object.

Reference will now be made in detail to exemplary disclosed embodiments, examples of which are illustrated in the accompanying drawings and disclosed herein. Where convenient, the same reference numbers will be used throughout the drawings to refer to the same or like parts.

Figure 1:
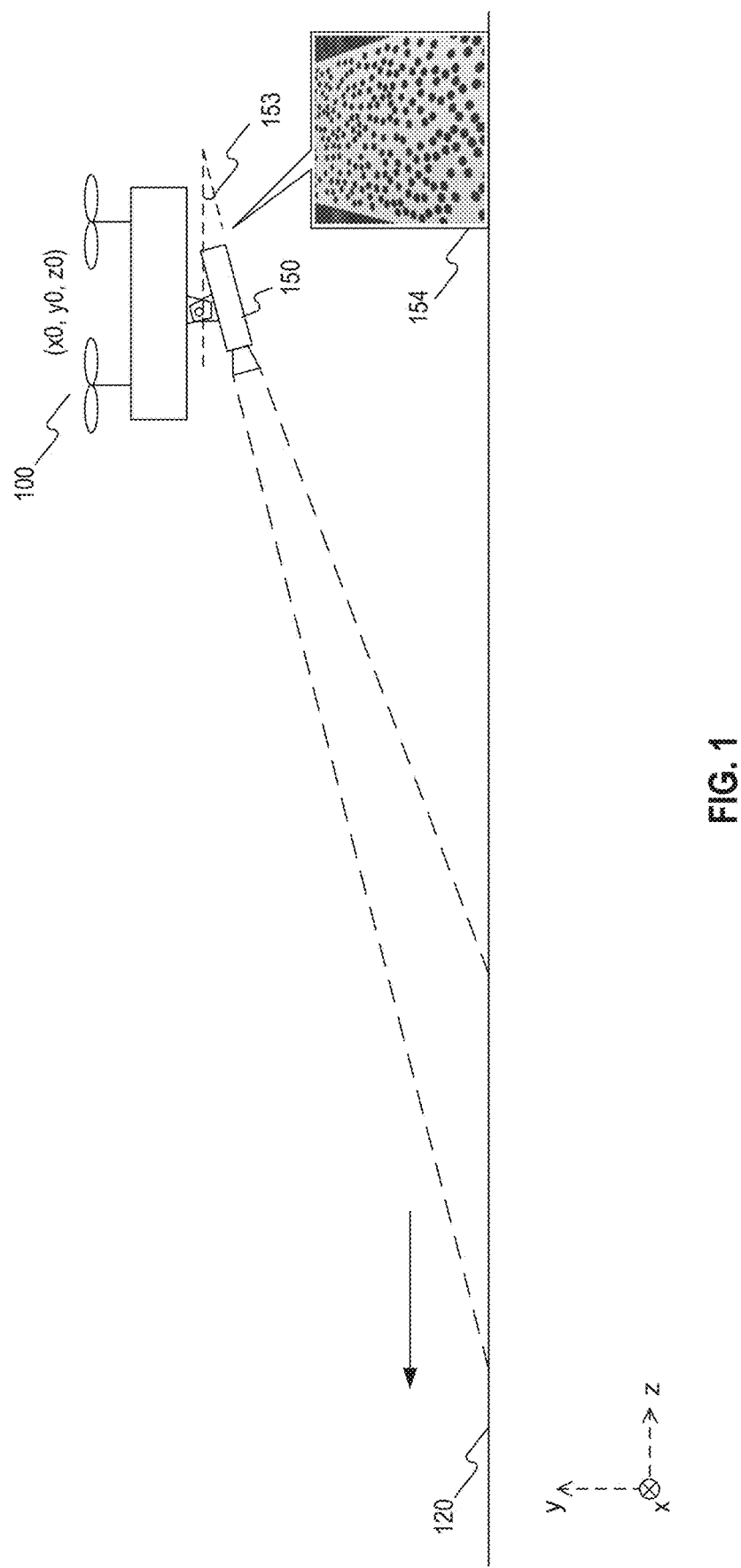
FIG. 1 illustrates a use case for exemplary embodiments of the present disclosure.

FIG. 1 is a diagram of a use case for exemplary embodiments of the present disclosure. A movable object 100 moves within a three-dimensional space defined by an x-axis, a y-axis, and a z-axis, above a surface 120. The x, y, and z axes may define, for example, the world coordinates of the environment in which movable object 100 operates.

Movable object 100 may be any suitable object, device, mechanism, system, or machine configured to travel on or within a suitable medium (e.g., a surface, air, water, rails, space, underground, etc.). For example, movable object 100 may be an unmanned aerial vehicle (UAV). Although movable object 100 is shown and described herein as a UAV for exemplary purposes of this description, it will be understood that other types of movable objects (e.g., wheeled objects, nautical objects, locomotive objects, other aerial objects, or the like) may also or alternatively be used in embodiments consistent with this disclosure. As used herein, the term UAV may refer to an aerial device configured to be operated and controlled autonomously (i.e., via an electronic control system) and/or manually by off-board personnel.

Movable object 100 includes a camera 150, which captures one or more images 154 of surface 120. In some embodiments, camera 150 can be configured to move and form a variable pitch angle 153 with respect to the x-y plane. In some embodiments (not shown in FIG. 1), camera 150 can form a fixed pitch angle with respect to movable object 100, and both the movable object and the camera can move together to form a pitch angle with respect to the x-y plane. Although FIG. 1 illustrates that movable object 100 includes a single camera 150, it is understood that movable object 100 can include a plurality of cameras to generate, for example, stereo images of surface 120.

In some embodiments, a set of features can be predetermined, and their physical locations are known, before the flight of movable object 100 starts. The features may include, for example, a set of preset markers on surface 120, a set of features associated with a set of objects on surface 120, etc. The features can include a set of dots, points, or objects of any shape. The features can correspond to physical markings on a surface of an object. The features can also refer to a set of descriptors obtained by transformation of an image of the object. Once movable object 100 is airborne, movable object 100 may capture image 154 and identify features from image 154 that match with at least some of the set of predetermined features. The physical location and orientation of movable object 100, denoted by the three-dimensional coordinates (x0, y0, z0) with respect to the x, y, and z-axes, can then be determined based on the known physical locations of the identified features, and based on the locations of these features in image 154. Moreover, an orientation R of movable object can also be determined based on the physical locations of the identified features and the locations of these features in image 154. The orientation may include, for example, a measurement of at least one of a roll angle, a yaw angle, and pitch angle of a predetermined axis of movable object 100 with respect to one of the x, y, and z-axes.

In some embodiments, identification of predetermined features may be achieved based on a set of invariant properties that are common between the predetermined features and the features in image 154. Invariant properties can include geometric properties that remain unchanged regardless of the perspective of a viewer or camera. For example, invariant properties remain constant even when the camera view point changes due to, for example, a rotation or a translational movement of the camera, a change of luminance and/or scaling of the image, etc. Such invariant properties may include, for example, scale invariant properties, perspective invariant properties, affine invariant properties, etc. These invariant properties, once determined for the predetermined features, allow later identification of the features in a captured image or a view from the movable object.

Figure 2A:
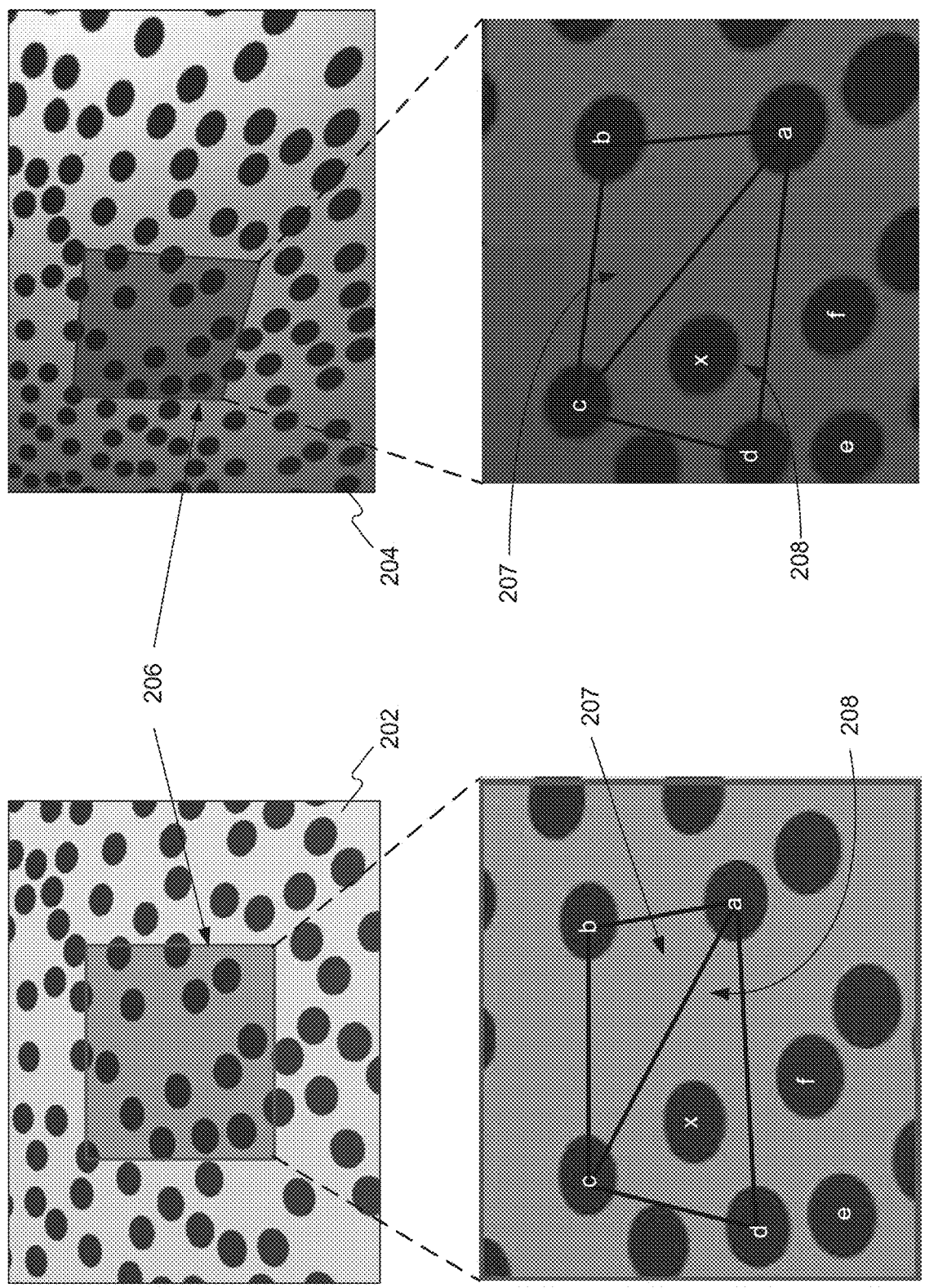
FIGS. 2A-2E illustrate an exemplary method of identifying features with affine invariant properties from an image, according to embodiments of the present disclosure.

FIG. 2A helps illustrate an exemplary affine invariant property. In FIG. 2A, images 202 and 204 capture the same region 206 of a surface, e.g., surface 120 of FIG. 1, at different time points and with different perspectives, such as different angles and/or distances with respect to the surface.

Region 206 includes a set of features, which include coplanar points or circular dots a, b, c, d, e, and f surrounding a certain point or circular dot x. For illustration purpose only, each point or circular dot in FIG. 2A can correspond to a feature. Points a, b, c, d, e, and f can be the closest points to point x within region 206, and are labeled in a predetermined direction, for example, in a clockwise direction around point x. Each circular dot can correspond to a feature. From among the six coplanar points, a subset of four points (e.g., points a, b, c, and d) can be selected to form two triangles 207 and 208. Based on affine geometry, a ratio between the areas of triangles 207 and 208, is an affine invariant, which can reflect that the parallelism of lines are preserved in affine transformation. Affine transformation may include, for example translation, scaling, reflection, rotation, etc. In other words, the ratio between the corresponding triangles 207 and 208 remains the same between image 202 and image 204, even though the two images were taken from different perspectives, which can introduce affine transformation. The areas of triangles 207 and 208 can be determined based on, for example, a count of a number of pixels bounded by the triangles, or based on the physical locations of the points a, b, c, and d that form the apexes of the triangles. Likewise, another subset of coplanar points, e.g., points a, c, d, and f, can also form two triangles, and are associated with another ratio that does not vary with affine transformation. Multiple invariant ratios can therefore be determined for the multiple subsets of points surrounding point x, and used to represent or describe point x. As to be described in more details below, these invariant ratios can be stored in a database or in a map, and can be used to determine whether a query point in a query image corresponds to point x.

Figure 2B:
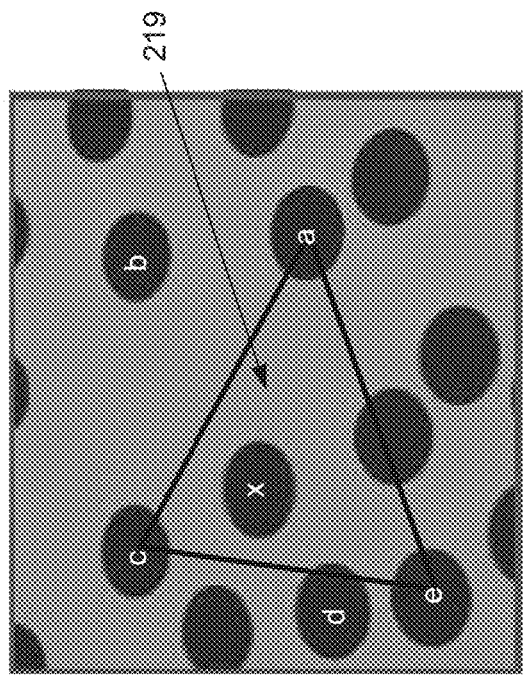
Figure 2B:
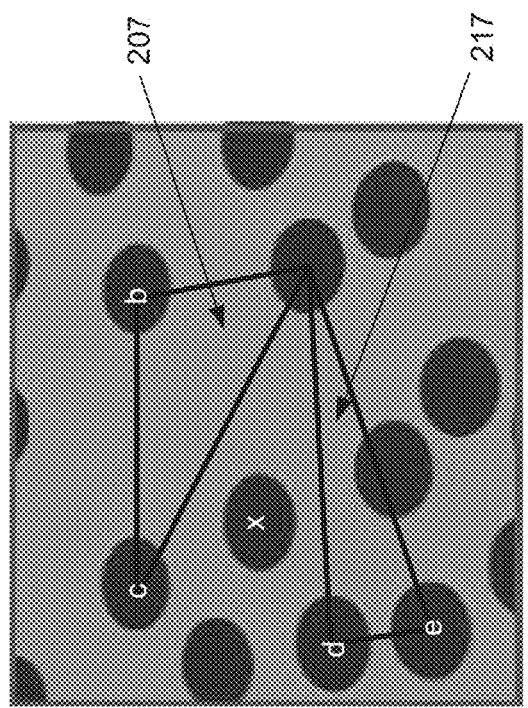
Figure 2B:
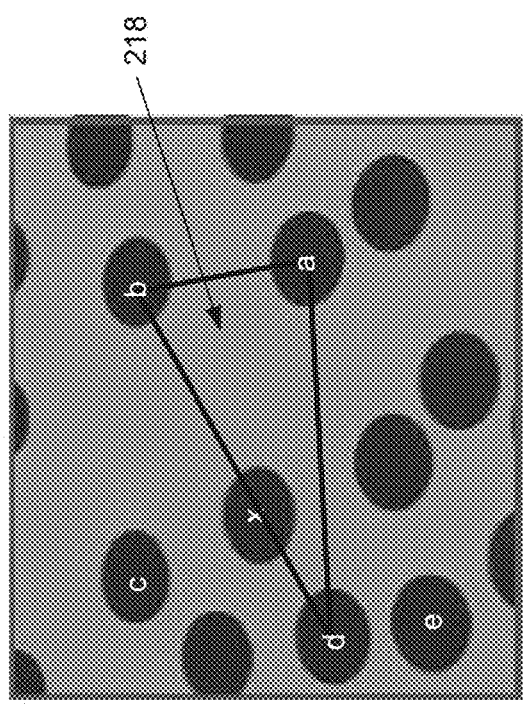

The features included in region 206 can also be associated with a prospective invariant property. Prospective invariant property can refer to geometric relationships that remain constant under perspective transformation. For example, referring to FIG. 2B, points a, b, c, d, and e can form four triangles. In addition to triangle 207 (formed by points a, b, and c), subsets of the points can also form triangle 217 (with points a, d, and e), triangle 218 (with points a, b, and d), and triangle 219 (with points a, c, and e). The ratio between a product of areas of triangles 207 and 217 and a product of areas of triangles 218 and 219 can be prospective invariants, which can reflect that these ratios remain invariant even if the coordinates of points a, b, c, d, and e in a different image change by perspective transformation.

Affine transformation can be more restrictive than perspective transformation, because affine transformation preserves the parallelism of lines, and perspective transformation does not always lead to affine transformation. On the other hand, affine invariant computation is simpler than perspective invariant computation, at least because affine invariant computation involves a smaller set of points (four points) than perspective invariant computation (five points). In a case where region 206 is small, the perspective transformation of region 206 can be approximated as affine transformation. In that case, instead of using perspective invariants for identifying the neighboring points of point x, affine invariants can be used.

Referring back to FIG. 1, the aforementioned affine and perspective invariant properties may be used for detecting and identifying predetermined features of surface 120 from image 154. For example, a set of predetermined features on surface 120 may be associated with certain geometric properties, which can remain invariant when these features appear in image 154, and their locations within the image have underdone perspective or affine transformation with respect to their physical locations on surface 120. The affine and perspective invariant properties allow these predetermined features to be identified from image 154.

The aforementioned invariant properties can be associated with a set of reference features with known physical locations. These information can be stored in a database or a map, and can be used to match up features extracted from an image with the set of reference features. For example, the invariant ratios (e.g., affine invariants, perspective invariants, etc.) of the different subsets of points surrounding point x in FIG. 2A may be calculated and, along with the physical locations or coordinates of each point, stored in a database or a map. Referring to the example shown in FIG. 1, during flight, a UAV (e.g., movable object 100) may capture images of surface 120, and points on the images may be analyzed, and a set of ratios associated with geometric properties of the points may be calculated. The calculated ratios may be compared against the invariant ratios stored in the database to correlate the points in the images with points in the database. Once multiple points are identified through this process, further steps may be taken to determine the UAV's location and orientation with respect to such points based on their locations on the images, as well as the physical locations of such points, as discussed below.

Consistent with embodiments of the present disclosure, the features to be identified from surface 120 may be randomly distributed to improve the accuracy of subsequent feature identification from the image. For example, the circular dots or points may be randomly distributed on surface 120. Also, as discussed more details below, in a case where the features are extraction in the form of feature descriptors by image transformation, the transformation can be configured such that the spatial distribution of the feature descriptors can be randomized.

FIG. 2A shows a pattern of preset circular dots provided on surface 120 as the set of predetermined features to facilitate detection and identification of the features. Alternatively, the set of predetermined features may include a number of three-dimensional objects (e.g., a table, a chair, etc.) or features of interest disposed on surface 120. Various algorithms may be used to identify such objects or features of interest with invariant properties. As an example, scale invariant feature transformation (SIFT) may be performed on the pixel data of the captured images to extract a set of keypoints that have scale invariant properties. The keypoints may be associated with visual appearance of three-dimensional objects on surface 120, or other distinct features that are determined to have scale invariant properties. Descriptors of the keypoints may be generated to describe relevant image attributes, such as distribution of pixel values, orientations, etc., of the keypoints.

Figure 2C:
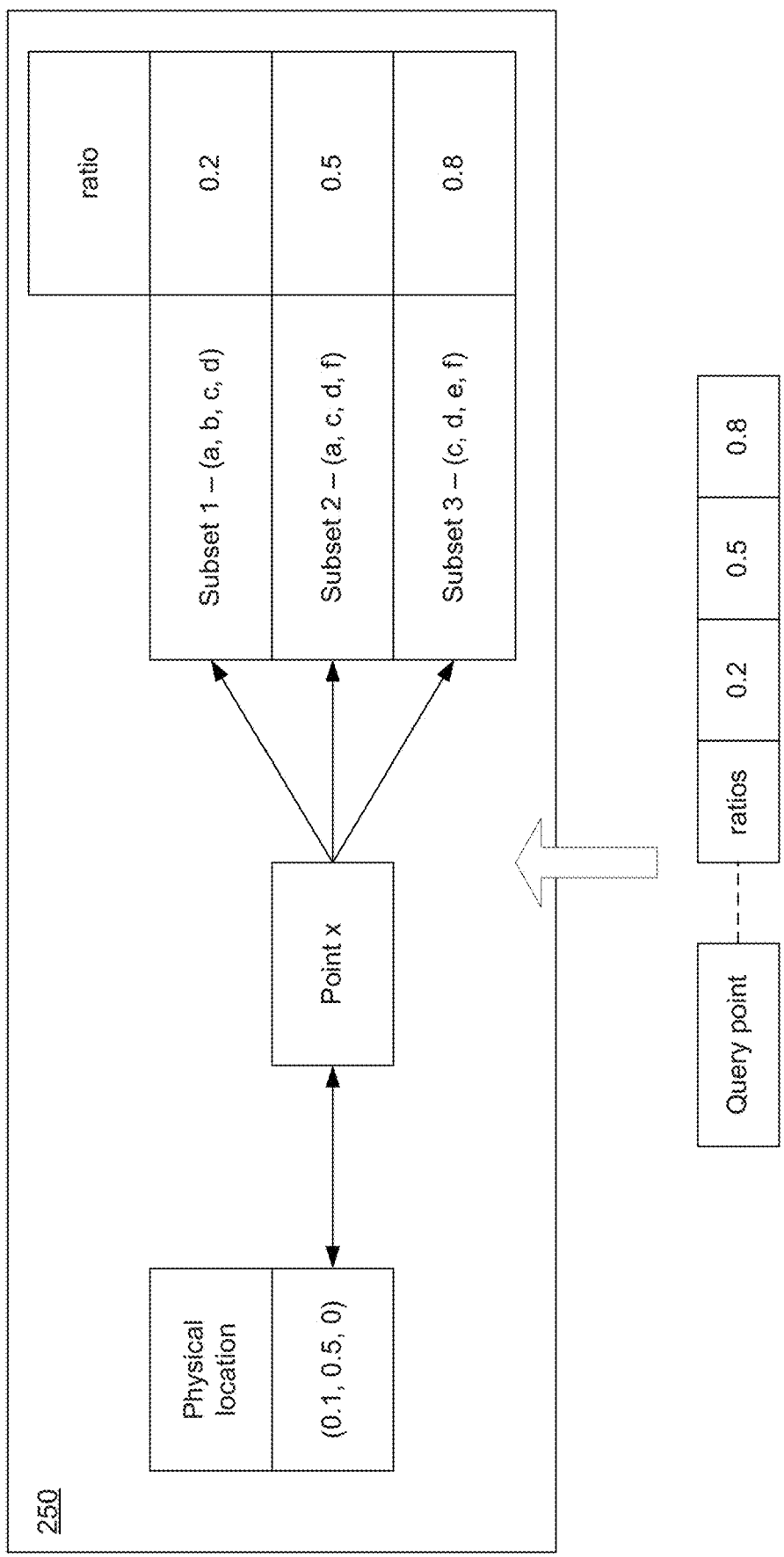

FIG. 2C illustrates an exemplary data structure 250 for storing such information in connection with the exemplary dot pattern shown in FIG. 2A. In particular, with respect to point x, data structure 250 can store a set of invariant ratios (e.g., affine invariant ratios, perspective invariant ratios, etc.) respectively associated with subset 1 (points a, b, c, and d), subset 2 (points a, c, d, and f), and subset 3 (points c, d, e, and f), etc. The physical location of point x on surface 120 is also stored as its coordinates. Point x can be one of the set of predetermined features, and similar information of other points can likewise be stored. Likewise, if keypoints were identified using SIFT, the scale invariant properties of the keypoints may be stored to comprise the data of the full map.

In one aspect of the present disclosure, the analysis of images to determine the set of features with invariant properties may be performed by a processor located on the movable object, on a camera, on a computer or a server, or any other device with sufficient power to do so. The data of the map may be stored in a memory located on the movable object, camera, or a computer server.

Consistent with embodiments of the present disclosure, through the analysis of the images, a set of predetermined features (e.g., circular dots or keypoints) with invariant properties may be identified for the entire environment a UAV may traverse. To create the full map with the data or information of the set of predetermined features with invariant properties, one may use cameras to take a series of images of the environment, such as surface 120. Alternatively, a UAV may perform a survey flight across the entire environment to take the series of images. The images (including, for example, images 202 and 204) may be stitched together to represent a full map of surface 120. Information of the set of predetermined features, for example, ratios and physical locations or coordinates, for the full map may be stored in a database for subsequent use. Alternatively, if the features are prearranged on surface 120, such as the random circular dots, the necessary information, including ratios and physical locations or coordinates, may be already known and stored, so that a survey flight or image analysis is unnecessary to create the full map.

The full map with the data or information of the set of predetermined features with invariant properties may then be used for determining a location of a movable object moving in the environment. For example, movable object 100 flies over surface 120 and captures one or more images of region 206. The images are analyzed to identify a query point and a set of points surrounding the query points. A set of ratios can be determined based on the geometric properties for various subsets of points surrounding the query point. The ratios are then compared to the invariant ratios stored in the full map. If the invariant ratios match those for the subset of points surrounding point x, it may be determined that the query point on the image is point x, and the physical location of point x is retrieved. In case the full map was created based on keypoints identified through SIFT, the images taken by the UAV during the actual flight may be analyzed in a similar fashion to correlate the keypoints.

For example, referring to FIG. 2C, a query point is identified on a captured image. The query point can be associated with a set of ratios based on geometric properties of subsets of points surrounding the query point. A system, such as a server, a processor on a UAV, a network of computing or image processing devices, or a standalone computer, etc. with access to the previously stored database or map, searches for and identifies points or features nearest to the identified point or feature. For example, ratios for subsets (e.g., subsets of four points) of the neighboring points that correspond to the subsets 1, 2, 3, etc. associated with point x of FIG. 2A are stored in data structure 250. The system can then compare the ratios associated with the query point with the invariant ratios associated with point x stored in data structure 250. If the ratios are matching, the system may determine that the query point is point x. Based on this determination, the system may also retrieve the physical location of point x stored in data structure 250.

Figure 2D:
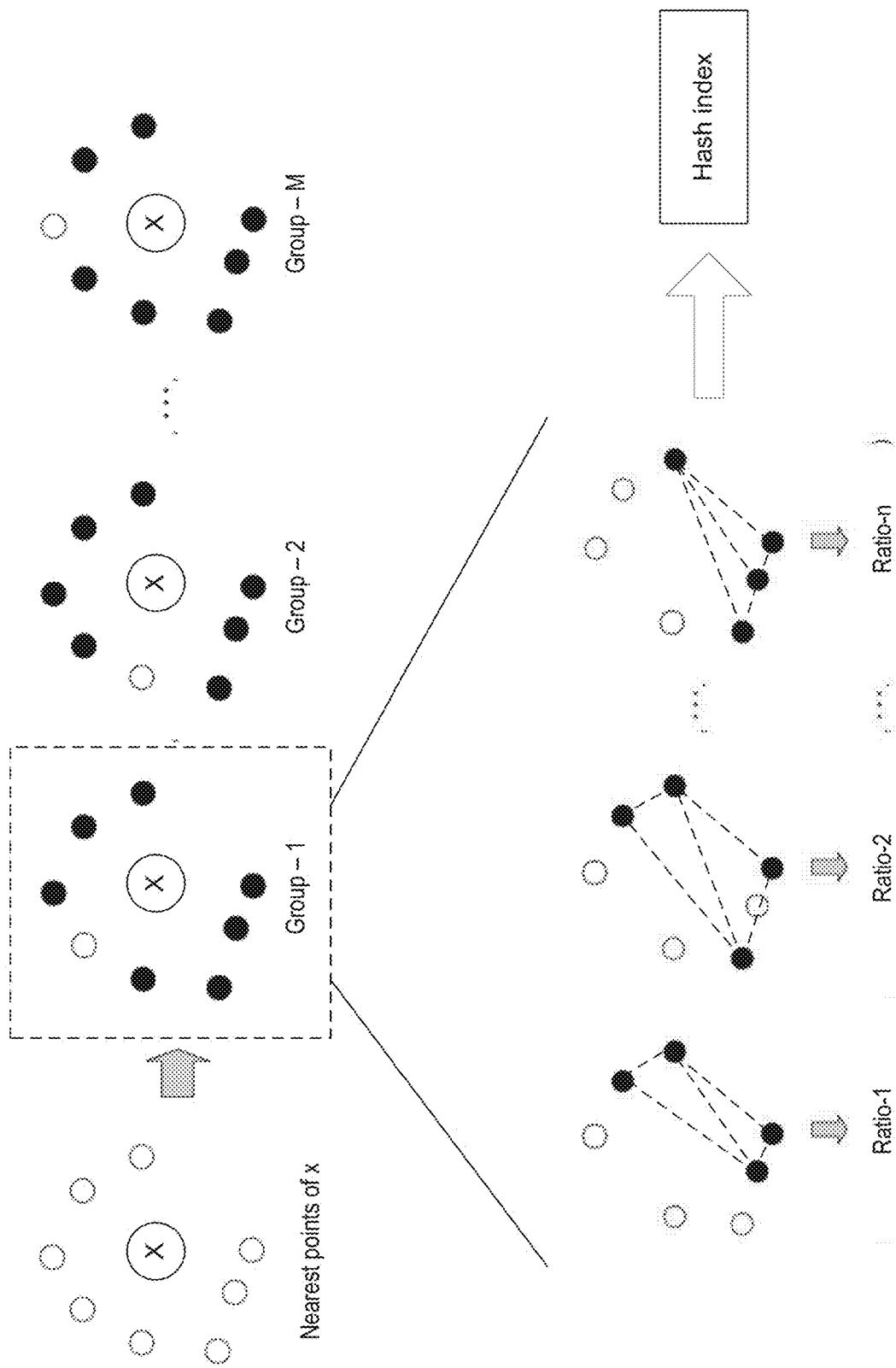

Moreover, as shown in FIG. 2D, in data structure 250 point x can also be associated with invariant ratios for different permutations of subsets of the neighboring points a, b, c, d, e, and f. With these permutations, even if the neighboring points in image 204 are rotated or (orientated at a different yaw, pitch, and roll angle) with respect to what they appear to be in image 202 (e.g., instead of a, b, c, d, e, and f, the subsets of neighboring points in image 204 are selected from b, c, d, e, f, and a), a system can still determine a matching ratio (or a matching combination of ratios) associated with the neighboring points in image 204. Additional points may be identified and correlated with points stored in the database or map. Thus, the physical location of the movable object can be determined based on the physical locations of point x and such other points.

In some embodiments, the predetermined features can be represented or identified based on various hashing techniques. A set of reference hashing indices can be computed and associated with point x, based on the aforementioned permutations of subsets of nearest neighboring points. For example, in FIG. 2D, a predetermined number (e.g., eight) of points nearest point x are identified from an image. Of the eight neighboring points, different permutations of groups of seven points (e.g., group-1, group-2, etc.) are identified. The permutations of groups can be configured to cover rotation of images, which can lead to different ordering of the neighboring points, as discussed above.

For each group of seven points, different permutations of group of four points can be identified, and a ratio (e.g., ratio-1, ratio-2, etc.) is determined for each group of four points. For each group, a hash index can be determined based on the following exemplary formula:

$$\text{index} = (\Sigma_{i=0}^{M} r_{(i)} k^i) \bmod H_{size} \qquad \text{(Expression 1)}$$

Here, mod refers to "modulo" operation. The parameter r(i) can refer to ratio-1, ratio-2, etc. The parameter k can be a predetermined constant with a value of, for example, 4. The parameter $H_{size}$ may refer to a size of a hash table. M is a number of permutations of groups of four points within a group of seven points, and can be given by $$C_4^7 = \frac{4!}{7!(7-4)!}.$$

Figure 2E:
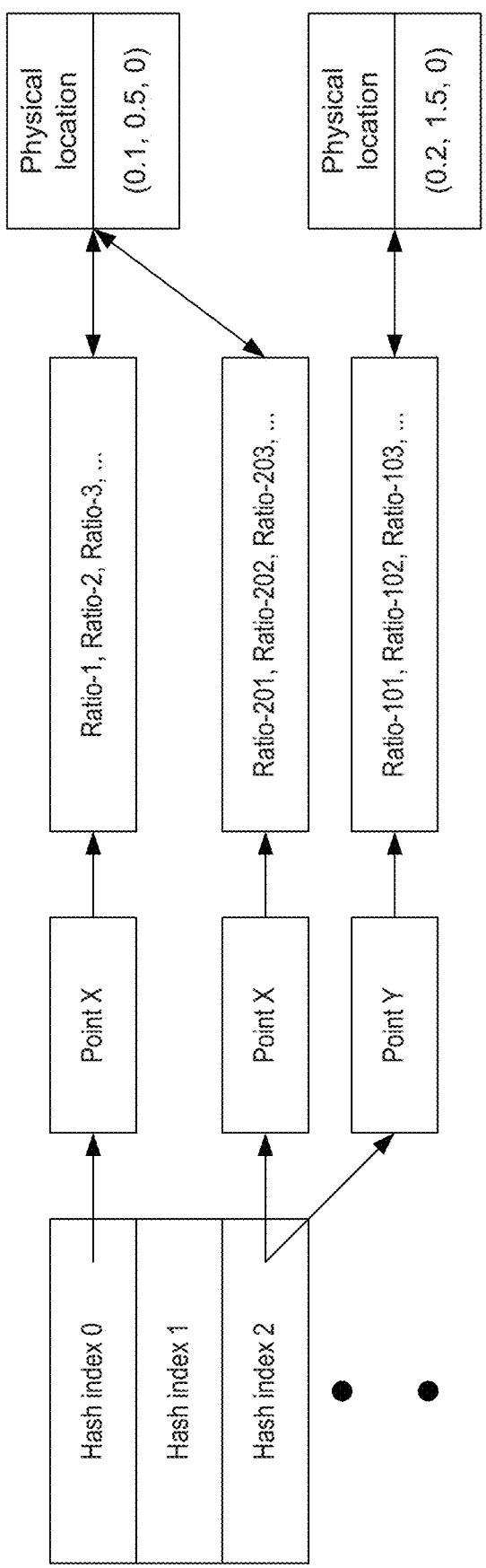

The hash index can then be associated with point x in a data structure. Reference is now made to FIG. 2E, which illustrates an exemplary data structure 270 that associates a set of reference features with hash indexes. As shown in FIG. 2E, data structure 270 includes an array of reference hash indexes, including hash index 0, hash index 1, hash index 2, etc., each of which can be determined based on Expression 1. For example, hash index 0 can be determined based on a set of reference ratios (ratio-1, ratio-2, ratio-3, etc.) of Group-1 of FIG. 2D, and can be associated with point x. Hash index 2 can also be determined based on another set of reference ratios of Group-2 of FIG. 2D. The reference ratios can be invariant ratios (e.g., affine invariant ratios, perspective invariant ratios, etc.) determined based on, for example, the physical locations of a set of markers on surface 120 of FIG. 1, the location of a set of feature descriptors from transformation of image 154 of FIG. 1, etc.

After identifying a query point from an image, the system can determine a set of eight nearest neighboring points to the extracted point. From the eight nearest neighboring points, the system can determine different permutations of groups of seven points. For each group of seven points, the system can determine different permutations of groups of four points, and the associated ratio in a similar fashion as described in FIG. 2C. For each group of seven points, the system can also determine a query hash index based on the ratios for the groups of four points according to, for example, Expression 1. The system can then search through the hash index array of data structure 270 to look for a reference hash index that matches with the query hash index.

As discussed above, the different permutations of groups of seven points can cover rotation (or change of orientation) of an image that can lead to change of order of neighboring points for ratio determinations. Therefore, if an extracted point is truly associated with point x, it can be expected that at least one permutation of the groups of seven neighboring points of the extracted point can yield a matching hash index, and that the ratios associated with that group of seven neighboring points can also match with the list of ratios associated with the matching hash index. Based on the matching hash index (e.g., hash index 2), the system can then determine the reference feature (e.g., point x) that corresponds to the extracted point, and the physical location of the reference feature.

In some embodiments, as shown in FIG. 2D, a hash index may be mapped to a plurality of features. For example, hash index 0 may also be associated with not only feature X but also feature Y. This can be due to, for example, the neighboring points for both features being associated with an identical list of ratios. If one hash index is associated with two features, the system may determine, based on that hash index, that an extracted point is mapped to two different features, and may produce inconsistent results.

To reduce the likelihood that different features are associated with the same hash index, the features can be spaced apart by a distance determined based on a random distribution. By randomizing the spacing between the features, the areas of triangles formed by the neighboring points, which depend on the spacing, can also be randomized as well. With such arrangements, the likelihood of two features being associated with identical ratios (and hash values) can be minimized.

In some embodiments, the system can perform additional processing to mitigate the likelihood of producing two features (or points) for a matching hash index. For example, the system may determine whether the matching hash index is associated with a reference feature that has been identified with other matching hash indices. As an illustrative example, referring to data structure 270 of FIG. 2E, assuming that for a first extracted point from image 204, the matching hash index is found to be hash index 0, and that the first extracted point is determined to correspond to point X. For a second extracted point from image 204, the matching hash index is found to be hash index 2, which is associated with points x and y. Based on a determination that the first extracted point has been found to be associated with hash index 0 and correspond to point X, the system can then determine that the second extracted point correspond to point Y.

As another example, after data structure 270 is created, the system can search for features that are associated with multiple hash indices, and update the hash index array such that each feature is associated with a single hash index, before providing data structure 270 for feature search.

Figure 3:
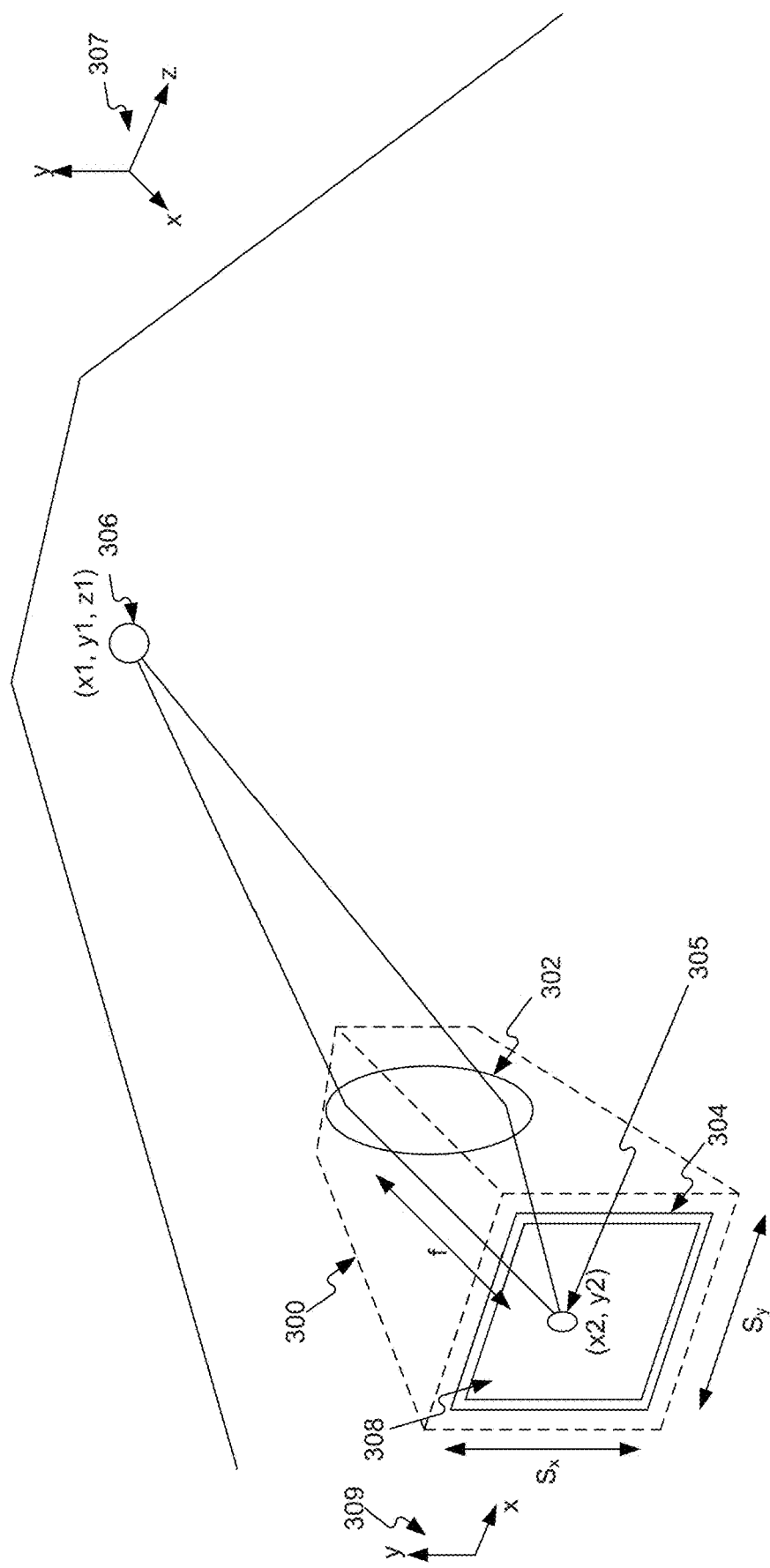
FIG. 3 illustrate an exemplary method for determining the orientation and physical location of the camera, according to embodiments of the present disclosure.

Once an extracted query point from an image is associated with a predetermined feature, the system can then determine the orientation and physical location of the camera that captures the image, based on the image location of the extracted point and the physical location of the predetermined feature. Reference is now made to FIG. 3, which illustrates an exemplary method of determining the orientation and physical location of the camera, according to embodiments of the present disclosure. As shown in FIG. 3, a camera 300 includes a lens 302 and a pixel array 304. Lens 302 has a focal length of f mm (millimeters). Pixel array 304 has a sensor size of $S_x$ mm by $S_y$ mm, and provides a pixel area with pixel dimensions $P_{width}$ pixels by $P_{height}$ pixels. Light projected from feature 306, which is associated with a three-dimensional coordinates (x1, y1, z1) defined by a world coordinate system 307, goes through lens 302 and received by pixel array 304 and forms a dot 305 on an image 308 at an image location (x2, y2) defined by the two-dimensional coordinate system 309 of an image plane.

Based on these information, a 3×3 rotation matrix [R] and a 3×1 translation matrix [T], which can represent respectively the orientation and three-dimensional physical location of camera 300, can be determined based on the following exemplary expressions:

$$\begin{bmatrix} x2 \\ y2 \\ 1 \end{bmatrix} = \begin{bmatrix} \alpha_x & \gamma & u_0 \\ 0 & \alpha_y & v_0 \\ 0 & 0 & 1 \end{bmatrix} [R|T] \begin{bmatrix} x1 \\ y1 \\ z1 \\ 1 \end{bmatrix} \quad \text{(Expression 2)}$$

Here, x2 and y2 are the two-dimensional coordinates of dot 305 on image 308, while x1, y1, and z1 are the three-dimensional coordinates of feature 306, as discussed above. Parameters $\alpha_x$ and $\alpha_y$ can be focal lengths scaled based on a ratio between the pixel array dimension and sensor size. Parameters $u_0$ and $v_0$ can be the location of the principal point of lens 302, which is typically at the center of pixel array 304. γ can be a skew coefficient between the x-axis and y-axis of two-dimensional coordinate system 309 of the image plane, and is typically zero. Parameters $\alpha_x$, $\alpha_y$, $u_0$, and $v_0$ can be determined based on the aforementioned internal properties of camera 300 with the following exemplary expressions:

$$\alpha_x = \frac{P_{width} \times f}{S_x} \quad \text{(Expression 3)}$$

$$\alpha_y = \frac{P_{height} \times f}{S_y} \quad \text{(Expression 4)}$$

$$u_0 = P_{width} \times 0.5 \quad \text{(Expression 5)}$$

$$v_0 = P_{height} \times 0.5 \quad \text{(Expression 6)}$$

As discussed above, based on invariant properties (e.g., affine invariance), a system can associate a feature on an image with a predetermined feature. Assuming that based on invariant properties, a system determines that dot 305 on image 308 corresponds to feature 306 of FIG. 3. Based on the aforementioned expressions and internal properties of camera 300, as well as the physical location of feature 306 and image location of dot 305, the system can then determine the rotation matrix [R] and the translation matrix [T] to represent the orientation and three-dimensional physical location of camera 300. For example, translation matrix [T] may include matrix values representing the (x0, y0, and z0) coordinates of movable object 100 of FIG. 1.

Although the orientation and three-dimensional physical location of the camera can be determined based on a single feature and its corresponding image, the accuracy of the determination can be affected if there is an error in the mapping between the feature and the image. To improve accuracy, the system can determine the orientation and physical location of the camera based on a plurality of features and their corresponding images, to filter out outlier samples. As an illustrative example, the system can determine a set of rotation matrices and translation matrices for a plurality of pairings of features and their corresponding images based on Expression 2. The system can then determine a re-projection error for each of the set of rotation matrices and translation matrices when applied to the physical locations of the features and their image locations in the corresponding images. The system can determine the re-projection error by, for example, applying a rotation matrix and a translation matrix to determine a re-projected image location (x2, y2) based on the physical locations of all of the plurality of features. The system can then compare the re-projected image location of a feature against the location of the image that (purportedly) corresponds to the feature to determine an error distance, which can represent the re-projection error. The system can then determine that a rotation matrix and a translation matrix that yield the minimum re-projection error, among the set of rotation matrices and translation matrices, represent the orientation and the physical location of the camera. In some embodiments, the system can also include a voting algorithm (e.g., ransom sample consensus (RANSAC)). Using RANSAC, the system can apply a voting scheme to a random set of samples of features, and find an optimal fitting result (e.g., an optimal rotational matrix and translation matrix) between the image locations and the physical locations of these features according to Expression 2.

Moreover, in some embodiments, the system can also iteratively update the estimated rotation matrix and translation matrix, as well as an estimation of camera parameters (e.g., skew parameters, principal point locations, etc.), based on re-projection errors computed from multiple images of the same features obtained at different time points. For each image, the system can use the aforementioned mechanism to determine a rotation matrix and a translation matrix (out of a set of rotation matrices and translation matrices) that yield the minimum re-projection error, as a starting point. The system can then apply the determined rotation matrix and translation matrix to compute a re-projection error for a subsequent image, and then update the matrices, as well as the camera parameters, to minimize the re-projection error. The updating of the rotation and/or translation matrix can reflect the speed and direction of movement of the camera (and the flying object that carries the camera). In a case where movable object 100 is equipped with sensors (e.g., speedometer, inertial measurement unit (IMU), etc.) to detect its speed and direction of movement, the sensor data can also be merged with the newly-captured image data to determine updates to the rotation and/or translation matrices. In some embodiments, a Bundle Adjustment Algorithm can be used to perform the aforementioned iterative updating. With such arrangements, the accuracy of determination of the physical location and movement information of movable object 100 can be further improved.

The speed and direction information can be useful in coordinating the flights of multiple flying objects. As an illustrative example, to control a number of flying objects to fly in a formation, the system can periodically update the rotation matrix and translation matrix for each of the flying object at a predetermined frequency (e.g., at 10 Hz or above), based on newly-captured images of the features on the ground. Based on the changes in the matrices, the system can determine a speed and a direction of movement of each flying object, and can control each flying object to maintain a predetermined distance between each other to form a flying formation.

In some embodiments, the aforementioned data structures 250 and 270, as well as information such as SIFT detection threshold, can be stored in a memory device disposed within movable object 100. These information can be provided to an automatic navigation and piloting system implemented on movable object 100. Based on these information, movable object 100 can determine its own location and orientation with respect to surface 120, and control its own speed and direction of motion based on the determination. In some embodiments, the aforementioned data structures 250 and 270, as well as information such as SIFT detection threshold, can also be stored in a memory device that is a part of an external control system to movable object 100. The control system can receive, wirelessly, image data captured by camera 150 of movable object 100, determine a location and an orientation of the movable object based on the image data, and then transmit instructions to movable object 100 to control a speed and a direction of movement of the movable object.

Embodiments of the present disclosure can also be used to determine an orientation and a physical location of a movable object as it flies over an uneven terrain. For example, in additional to data structure 250 (or 270) that stores a set of affine invariant parameters (e.g., ratios) associated with coplanar features, a system can also set up a separate data structure to store information about features that are not coplanar, including features on uneven terrains. Those features can be represented by three-dimensional point clouds generated using, for example, semi-global block matching (SGBM) algorithms, which can determine pixel value transitions and produce a pixel disparity map. Each point in the three-dimensional point clouds can be associated with a three-dimensional physical location in the separate data structure. The physical locations can be pre-determined and known (e.g., the features are associated with objects with known physical locations). Alternatively, the physical locations can also be determined using a stereo visual odometry algorithm based on stereo images of the terrain. The point clouds can be stored in the separate data structure as references, before the flight of movable object 100 starts.

As movable object 100 flies over the uneven terrain, the system can detect whether an image captured of the uneven terrain is dominated by features on flat surfaces (or being coplanar) or on uneven surfaces. The determination can be made based on, for example, depth information of the features extracted from stereo images. In a case where neighboring features have different depths, the system may determine that those features are on uneven surfaces.

For features on uneven surfaces, the system may generate a query three-dimensional point cloud. The system can then determine using, for example, an iterative-closest-point (ICP) algorithm, a translation matrix and a rotation matrix that can transform the three-dimensional point cloud to match up with one of the pre-stored reference point clouds. For example, using ICP, the system can pair up a point in the query three-dimensional point cloud with the closest point in a reference point cloud. The system can then estimate the translation and rotation matrices that can align the pair of points within a certain mean squared error. The system can then iteratively change the pairing and the estimation of the matrices to reach a convergence condition (e.g., when the aggregate mean squared error is minimized). The final translation matrix and the rotation matrix can then be used to represent the physical location and the orientation of the camera.

On the other hand, for features on even surfaces (or being coplanar), the system may extract a point or determine a descriptor based on transformation of the image, and then refer to data structures 250 or 270 to search for a matching feature and its associated physical location, and then determine the translation and rotation matrices based on, for example, the aforementioned expressions 2-6.

Figure 4:
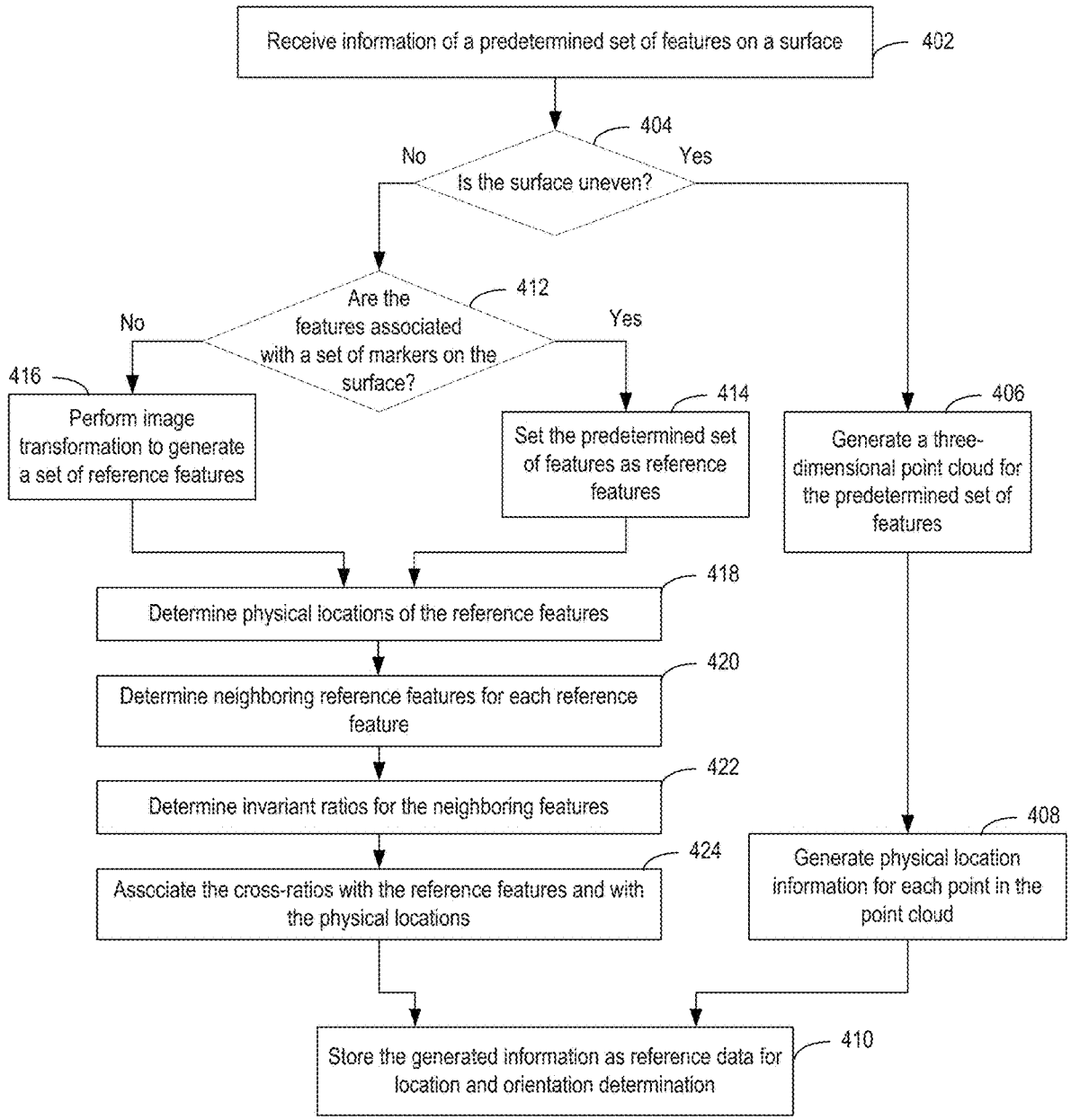
FIG. 4 is a flowchart illustrating an exemplary method for generating reference data for determination of physical location and orientation of a movable object, according to embodiments of the present disclosure.

Reference is now made to FIG. 4, which illustrates a sequence of steps that performs an exemplary process 400 for generating reference data for determination of physical location and orientation of a movable object, according to embodiments of the present disclosure. The process of FIG. 4 may be implemented in software, hardware, or any combination thereof. For purposes of explanation and not limitation, the process 400 will be described in the context of movable object 100.

In step 402, the system receives information of a set of predetermined features on a surface. In some embodiments, the information can include, for example, a predetermined distribution of markers on the surface and their physical locations on the surface. The markers can be distributed such that the separations between neighboring markers follow a random function. The physical locations can be represented as three-dimensional coordinates in a world coordinates system and can be measured with a predetermined reference point (e.g., the center of a room). In some embodiments, the information can include one or more stereo images of the surface captured by a movable object (e.g., movable object 100) when it flies over the surface.

In step 404, the system determines whether the surface is uneven. The determination can be based on, for example, depth information of the features obtained from the stereo images obtained in step 402.

If the system determines that the surface is uneven in step 404, the system can then proceed to step 406 to generate a three-dimensional point cloud to represent the predetermined set of features. The generation of the point cloud can be based on, for example, semi-global block matching (SGBM) algorithms, and can include step 408 to generate physical location information for each point in the point cloud. The system then proceed to step 410 and store the generated information as reference data, which can be used for determination of location and orientation of a movable object.

On the other hand, if the system determines that the surface is not uneven (e.g., such that the features are coplanar) in step 404, the system can then proceed to step 412 to determine whether the features are associated with a set of markers on the surface (e.g., similar to the ones shown in FIG. 2A). If the features are determined to be associated with a set of markers in step 412, the system can proceed to step 414 to set the set of predetermined features as reference features. If the features are determined as not associated with a set of markers in step 412, the system can proceed to step 416 and perform image transformation (e.g., SIFT transformation) on the stereo images (obtained in step 402) to generate descriptors representing a set of reference features. The SIFT detection threshold can also be configured such that the separations between neighboring reference features follow a random function.

The system can then proceed to step 418 to determine the physical locations of the reference features. In a case where the reference features are determined from a set of markers, the physical locations can be determined based on the distribution information obtained in step 404. In a case where the reference features are determined from image transformation, the physical locations of the reference features can be determined based on, for example, a stereo visual odometry algorithm based on the stereo images.

The system can then proceed to step 420 to determine a set of neighboring features for reach reference feature. The determination can be based on, for example, physical locations of the set of reference features in step 418. Referring back to FIG. 2D, for each reference feature, the system can determine, in a clockwise direction, a set (e.g., eight) of closest neighboring reference features. For each set, system can determine a number of groups of neighboring points, and for each group, a number of subsets of the neighboring points.

The system can then proceed to step 422 to determine an invariant ratio for each of the number of subsets of the neighboring points. The determination of the invariant ratio may include, for example, identifying two triangles formed by a subset of four neighboring points, and determining a ratio of areas between the two triangles. The ratio can be an affine invariant. The determination of the invariant ratio may also include, for example, identifying four triangles formed by a subset of five neighboring points, and determining a ratio of product of areas among the four triangles. In this case, the ratio can be a perspective invariant. The determination of the triangle areas can be based on, for example, counting a number of pixels enclosed in the triangles, or based on geometry. The system can then proceed to step 424 to associate the ratios with the reference features and with the physical locations, in a similar fashion as data structures 250 and 270 of FIGS. 2B and 2D. In some embodiments, the system may determine a hash index based on a set of ratios for a particular group of neighboring points, and associate the hash index with the reference features. The system can then proceed to step 410 to store the generated information as reference data.

Figure 5:
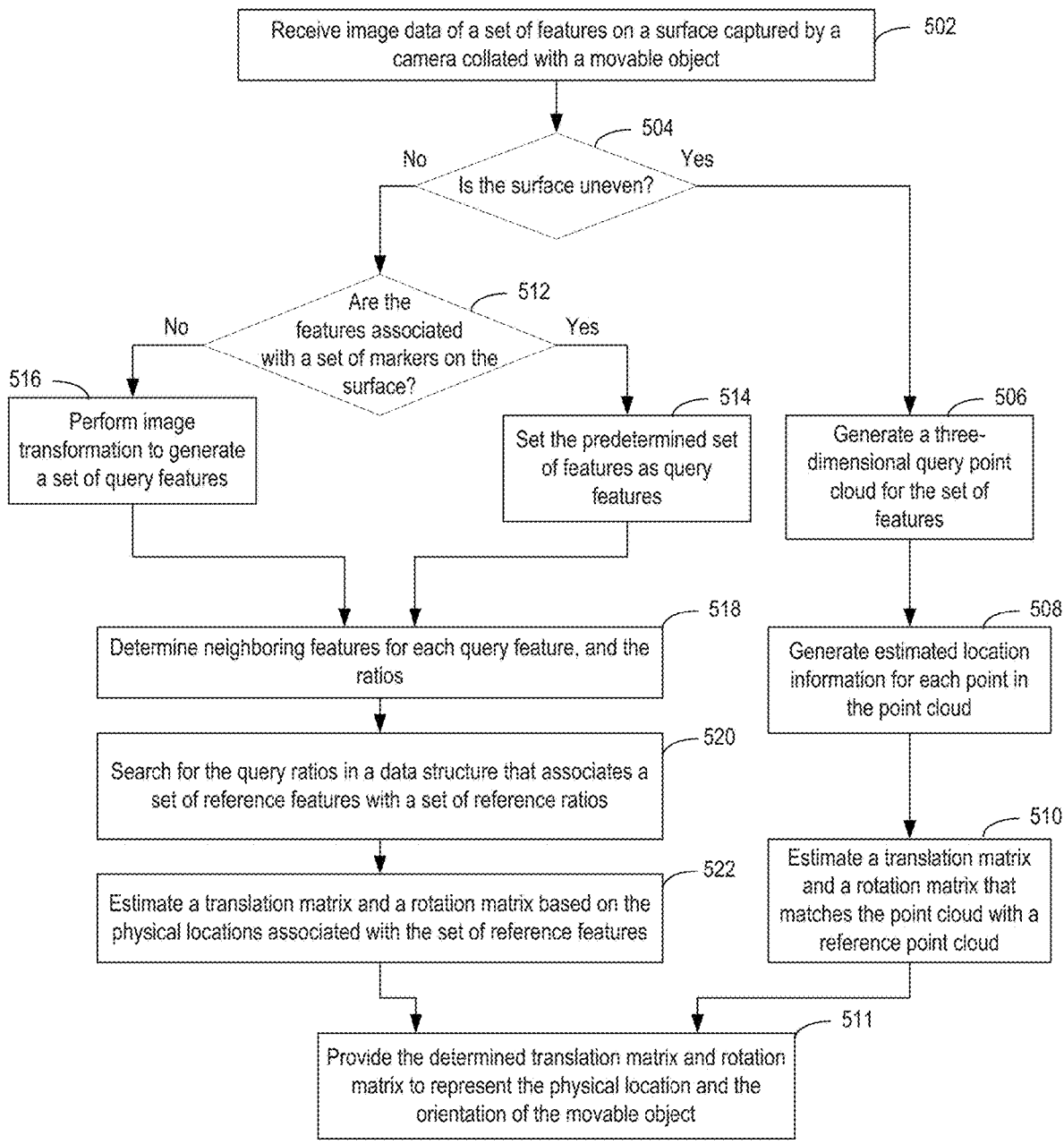
FIG. 5 is a flowchart illustrating an exemplary method for determining a location and an orientation of a movable object based on image data, according to embodiments of the present disclosure.

Reference is now made to FIG. 5, which illustrates a sequence of steps that performs an exemplary process 500 for determining a location and an orientation of a movable object based on image data, according to embodiments of the present disclosure. The process of FIG. 5 may be implemented in software, hardware, or any combination thereof. For purposes of explanation and not limitation, the process 500 will be described in the context of movable object 100.

In step 502, the system receives image data of a set of features on a surface. The image data can be captured by camera 150 of movable object 100 when it flies over the surface. The image data can include stereo image data.

In step 504, the system determines whether the surface is uneven. The determination can be based on, for example, depth information of the features obtained from the stereo images obtained in step 502.

If the system determines that the surface is uneven in step 504, the system can then proceed to step 506 to generate a three-dimensional query point cloud to represent the set of features. The generation of the query point cloud can be based on, for example, semi-global block matching (SGBM) algorithms, and can include step 508 to generate estimated location information for each point in the query point cloud.

After generating the query point cloud, the system can then proceed to step 510 to estimate a translation matrix and a rotation matrix that can transform the three-dimensional query point cloud to match up with one of the pre-stored reference point clouds. In some embodiments, the system may perform the ICP algorithm, in which the system pairs up a point in the three-dimensional query point cloud generated in step 506 with the closest point in a reference point cloud. The reference point cloud may have been pre-stored in a storage device and generated prior to the flight of the movable object. The system can then estimate the translation and rotation matrices that can align the pair of points within a certain mean squared error. The system can then iteratively change the pairing and the estimation of the matrices to reach a convergence condition (e.g., when the aggregate mean squared error is minimized). The system can then provide the final translation matrix and the rotation matrix to represent the physical location and the orientation of the camera, in step 511.

On the other hand, if the system determines that the surface is not uneven (e.g., such that the set of features are coplanar) in step 504, the system can then proceed to step 512 to determine whether the features are associated with a set of markers on the surface (e.g., similar to the ones shown in FIG. 2A). The determination can be based on predetermined information such as, for example, whether the movable object is known to be flying over a surface with a set of markers.

If the features are determined to be associated with a set of markers in step 512, the system can proceed to step 514 to set the set of predetermined features as query features. If the features are determined as not associated with a set of markers in step 512, the system can proceed to step 516 and perform image transformation (e.g., SIFT transformation) on the stereo images (obtained in step 502) to generate descriptors representing a set of reference features. The SIFT transformation and descriptor generation can be based on SIFT detection threshold stored in the storage device.

The system can then proceed to step 518 to determine neighboring reference features for each query feature, and the associated query ratios, in a similar manner as depicted in FIG. 2D. The system can also proceed to search for the query ratios in a data structure that associates a set of reference features with a set of invariant ratios, in step 520. The search can include, for example, generating a hash index based on the ratios, and performing aforementioned additional processing to filter out reference features that are associated with multiple hash indices. After finding a reference feature with matching ratios (or hash index), the system can then proceed to step 522 to estimate a translation matrix and a rotation matrix based on the physical location associated with the reference feature, the image location of the query feature, and internal parameters of the camera, according to expressions 2-6 as discussed above. In some embodiments, the system may also perform additional processing on the determined matrices values to reduce re-projection errors among a set of features on the same image and in subsequent images, as discussed above. The system can then proceed to step 511 and provide the determined translation matrix and the rotation matrix to represent the physical location and the orientation of the camera.

Figure 6:
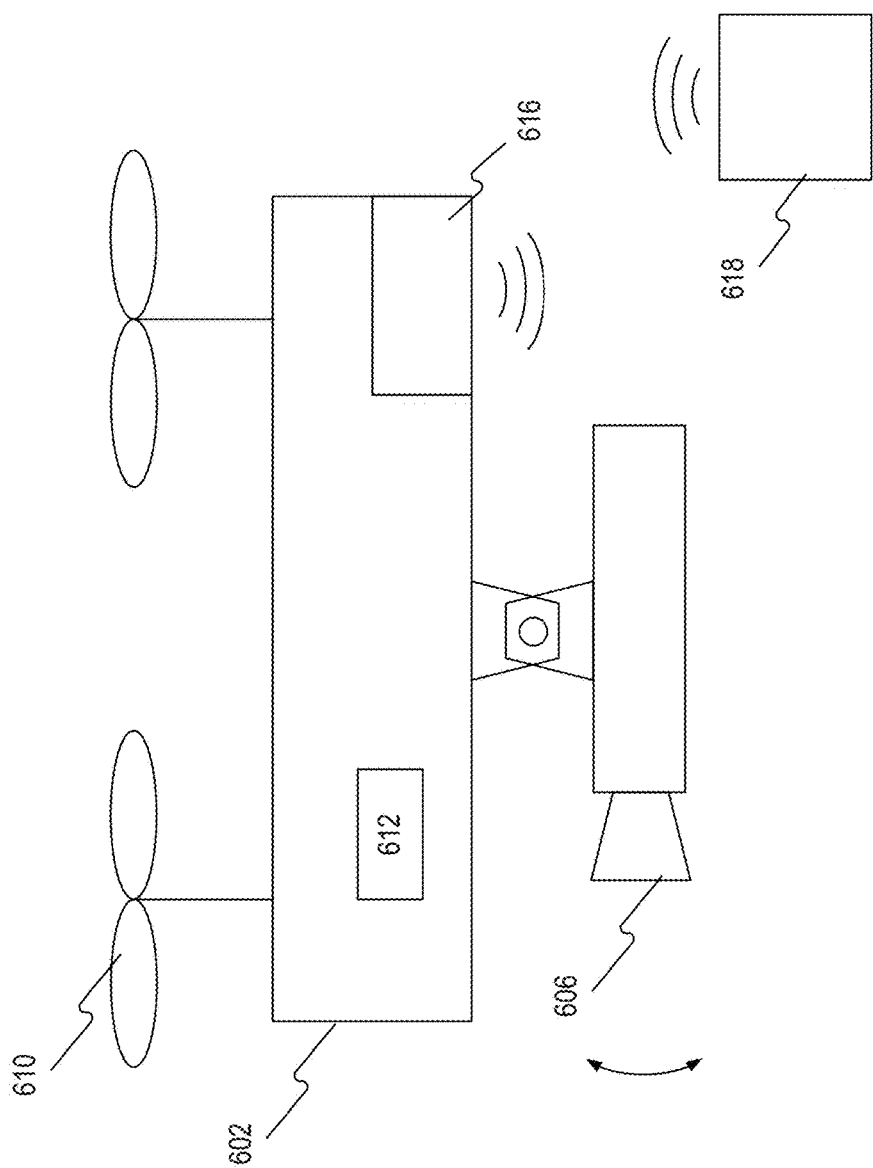
FIGS. 6 and 7 illustrate exemplary systems for determining three-dimensional coordinates of a target based on image data and target location, according to embodiments of the present disclosure.

Reference is now made to FIG. 6, which is a diagram of an exemplary system 600 for performing one or more operations in accordance with the disclosed embodiments. As shown in FIG. 6, system 600 may include a housing 602, imaging equipment 606 (e.g., a camera) to capture the images of a target object, and one or more propellers 610. In some embodiments, imaging equipment 606 may be coupled with housing 602 via a hinge, and can form a variable angle with respect to housing 602. Housing 602 may mechanical components such as motors and actuators to control the motions of imaging equipment 606 and propellers 610. Housing 602 may also include a sensor 612 configured to detection an orientation and/or a speed of movement of system 600. Sensor 612 may include sensor components such as accelerometer, gyroscopes, magnetometers, speedometer, etc.

Housing 602 may also house one or more communication systems 616. Communication system 616 can enable system 600 to transmit, for example, image data captured by camera 606 to an external control system, which allows the external control system to determine the orientation and physical location of system 600 based on the image data as discussed above. Communication system 616 can also enable system 600 to receive an instruction to control the speed and direction of movement of system 600. As an illustrative example, in a case where the external control system coordinates the flights of multiple flying objects (e.g., to fly in a formation), each of the flying objects can transmit image data to the external control system, which can then determine the physical locations and orientations for each flying object based on the image data, and transmit instructions to control each of the flying objects to fly in the formation. Communication system 616 enables each of the flying objects to receive the instructions.

Figure 7:
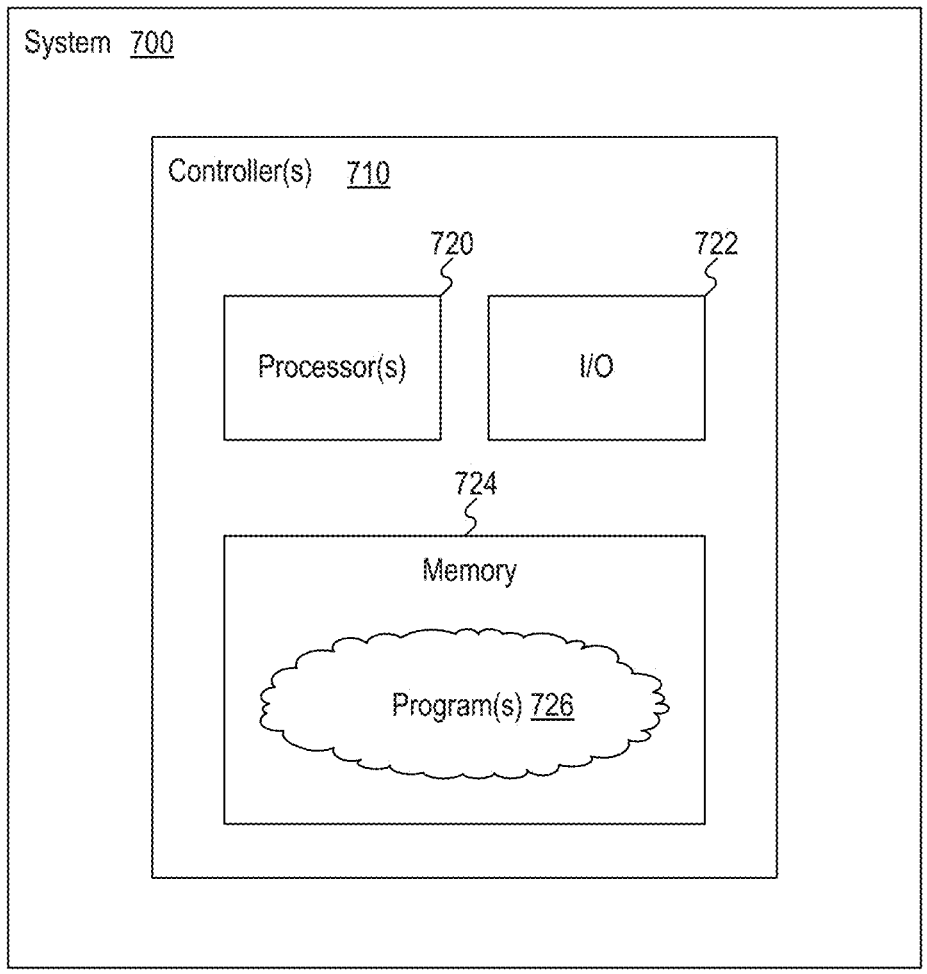

Housing 602 may also house a controller system that includes one or more processors, one or more input/output (I/O) devices, and one or more memories. Reference is now made to FIG. 7, which is a schematic block diagram of an exemplary system 700 that may be used in accordance with the disclosed embodiments. System 700 may include one or more processors 720, one or more I/O devices 722, and one or more memories 724, which in some embodiments may be implemented within one or more controllers 710. In some embodiments, system 700 may take the form of a mobile computing device, general-purpose computer, etc., for performing one or more operations consistent with the disclosed embodiments.

Processor 720 may include one or more known processing devices. For example, the processor may be from the family of processors manufactured by Intel, from the family of processors manufactured by Advanced Micro Devices, or the like. Alternatively, the processor may be based on the ARM architecture. In some embodiments, the processor may be a mobile processor. The disclosed embodiments are not limited to any type of processor configured in controller 710.

I/O devices 722 may be one or more devices configured to allow data to be received and/or transmitted by the controller 710. The I/O devices 722 may include one or more communication devices and interfaces, and any necessary analog-to-digital and digital-to-analog converters, to communicate with and/or control other mechanical components and devices, such as imaging equipment 606, propellers 610, IMU 612, and communication system 616.

Memory 724 may include one or more storage devices configured to store software instructions used by the processor 720 to perform functions related to the disclosed embodiments. For example, the memory 724 may be configured to store software instructions, such as program(s) 726, that perform one or more operations when executed by the processor(s) 520. For example, memory 724 may include a single program 726, such as a user-level application, that performs the functions of the disclosed embodiments, or may comprise multiple software programs. Additionally, the processor 720 may execute one or more programs (or portions thereof) remotely located from the controller 710. Furthermore, memory 724 also may be configured to store data, for example, for use by the software program(s) 726. Memory 724 may be configured to store, for example, data structures 250 and/or 270 that associate a set of predetermined features with ratios (or hash values determined from the ratios). Memory 724 may also be configured to store, for example, SIFT detection thresholds which allow system 600 to generate SIFT feature descriptors and determine matching ratios (or hash values) in data structures 250 and/or 270. Memory 724 may also be configured to store, for example, a set of reference point clouds representing features disposed on uneven terrains.

In some embodiments, systems 600 and 700 can be configured as movable object 100 of FIG. 1, and software program(s) 726 can include one or more software modules that, when executed by controllers 710, perform a method of determining an orientation and a physical location of a movable object based on image data captured by a camera of the movable object, consistent with embodiments of the present disclosure.

For example, referring back to FIG. 6, software program(s) 726 can include one or more software modules configured to process the image data captured by imaging equipment 606 to extract a point (or a feature descriptor), and to determine a set of ratios associated with a set of neighboring points of the extracted point. Software program(s) 526 can also include software modules configured to search, from data structures 250 and/or 270 stored in memory 724, a matching feature based on the set of ratios. Software program(s) 726 can also include software modules configured to determine a rotation matrix and a translation matrix that represent an orientation and a physical location of the movable object, based on the physical location of the matching feature, the image location of the extracted point, and expressions 2-6 as discussed above. Software program(s) 726 can also include software modules configured to determine a three-dimensional point cloud to represent features disposed on an uneven terrain, and then determine the rotation and translation matrices that align the three-dimensional point cloud with a reference point cloud. Software program(s) 726 can also include software modules configured to control a motion of system 600 (e.g. by configuring the actions of propellers 610 via I/O devices 722) based on a determined orientation and physical location of the movable object.

Figure 8:
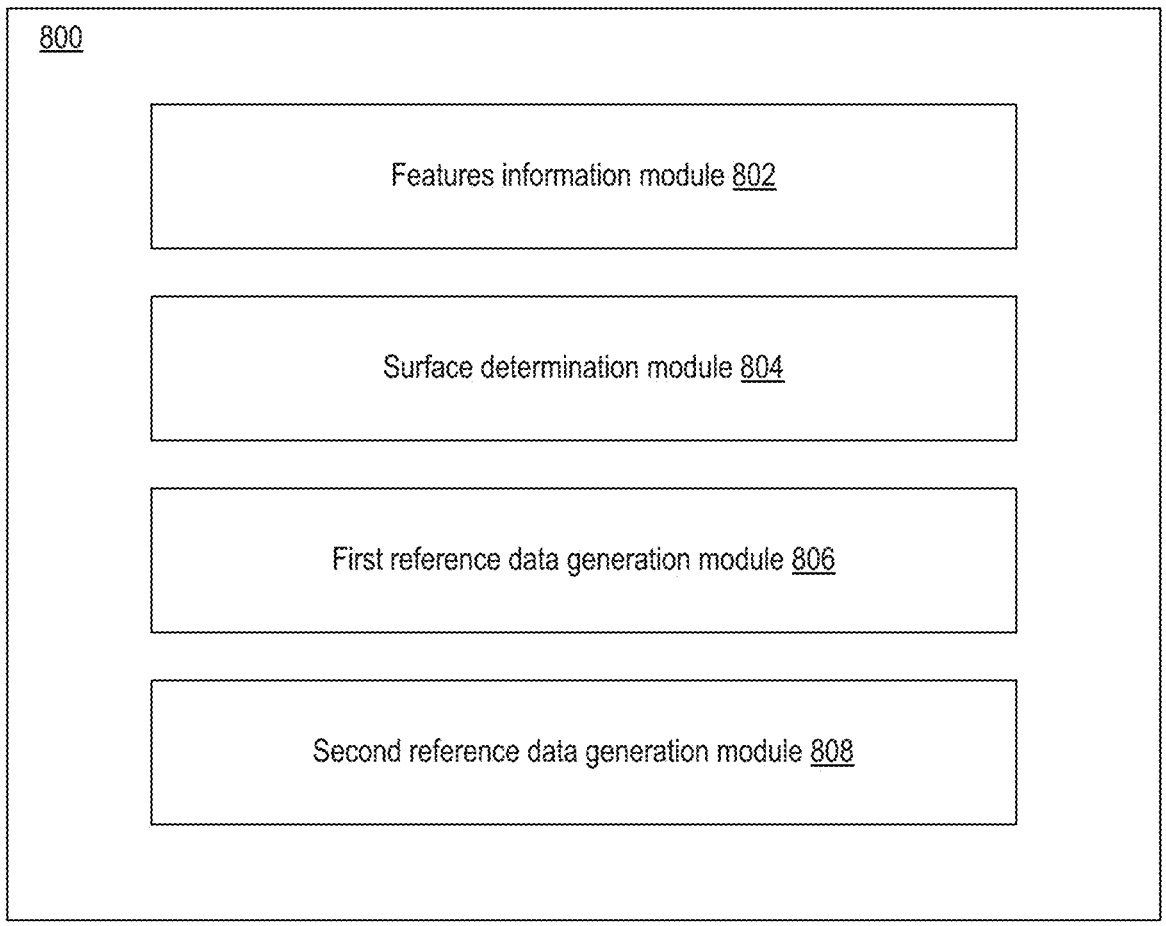
FIG. 8 is a schematic diagram of an exemplary system for generating reference data for determination of physical location and orientation of a movable object, according to embodiments of the present disclosure.

Reference is now made to FIG. 8, which is a schematic block diagram of an exemplary system 800 for generating reference data for determination of physical location and orientation of a movable object, according to embodiments of the present disclosure. As shown in FIG. 8, system 800 includes a features information module 802, a surface determination module 804, a first reference data generation module 806, and a second reference data generation module 808.

For the purposes of this disclosure, "modules" may be implemented in software, hardware, firmware, a mix of any of those, or the like. For example, if the disclosed "modules" are implemented in software, they may be stored in memory 524 of system 500 as components of program(s) 526, and include code instructions executable by one or more processors, alone or in various combinations with other modules disclosed in this or other embodiments. On the other hand, the disclosed "modules" can also be implemented in hardware such as, for example, application specific integrated circuits (ASIC), field-programmable gate array (FPGA), etc. System 800 may be housed in, for example, movable object 100.

In some embodiments, features information module 802 is configured to receive information of a set of predetermined features on a surface. The information can be in the form of a map that associates the features with pre-determined physical locations. The information can also include one or more stereo images of the surface captured by a movable object (e.g., movable object 100) when it flies over the surface. In some embodiments, features information module 802 is configured to perform at least a part of step 402 of FIG. 4.

In some embodiments, surface determination module 804 is configured to determine whether the surface on which the set of predetermined features are positioned is uneven. If surface determination module 804 determines that the surface is even, it can trigger first reference data generation module 806 to generate reference data including a first set of reference features and their associated physical locations. If the surface is determined to be uneven, surface determination module 804 can trigger second reference data generation module 808 to generate reference data including a second set of reference features and their associated physical locations. In some embodiments, surface determination module 804 is configured to perform at least a part of step 404 of FIG. 4.

In some embodiments, first reference data generation module 806 is configured to generate reference data including a first set of reference features associated with invariant properties, such as affine invariance, and with physical locations. For example, first reference data generation module 806 may determine physical locations of a set of predetermined features based on the information provided by first features information module 806, determine invariant ratios based on the physical locations, and associate the ratios with the features and their physical locations. If those features are associated with a set of markets on the surface, first reference data generation module 806 may designate those features as reference features. If those features are not associated with a set of markers on the surface, first reference data generation module 806 may also perform image transformation (e.g., SIFT) to generate a set of reference features. In some embodiments, first feature data generation module 806 is configured to perform at least a part of steps 412 to 424 of FIG. 4.

In some embodiments, second reference data generation module 808 is configured to generate a second set of reference features as a three-dimensional point cloud to represent the predetermined set of features, if the set of predetermined features are on an uneven surface. Second reference data generation module 808 may also generate physical location information for each point in the point cloud. In some embodiments, second reference data generation module 808 is configured to perform at least a part of steps 406 and 408 of FIG. 4.

Figure 9:
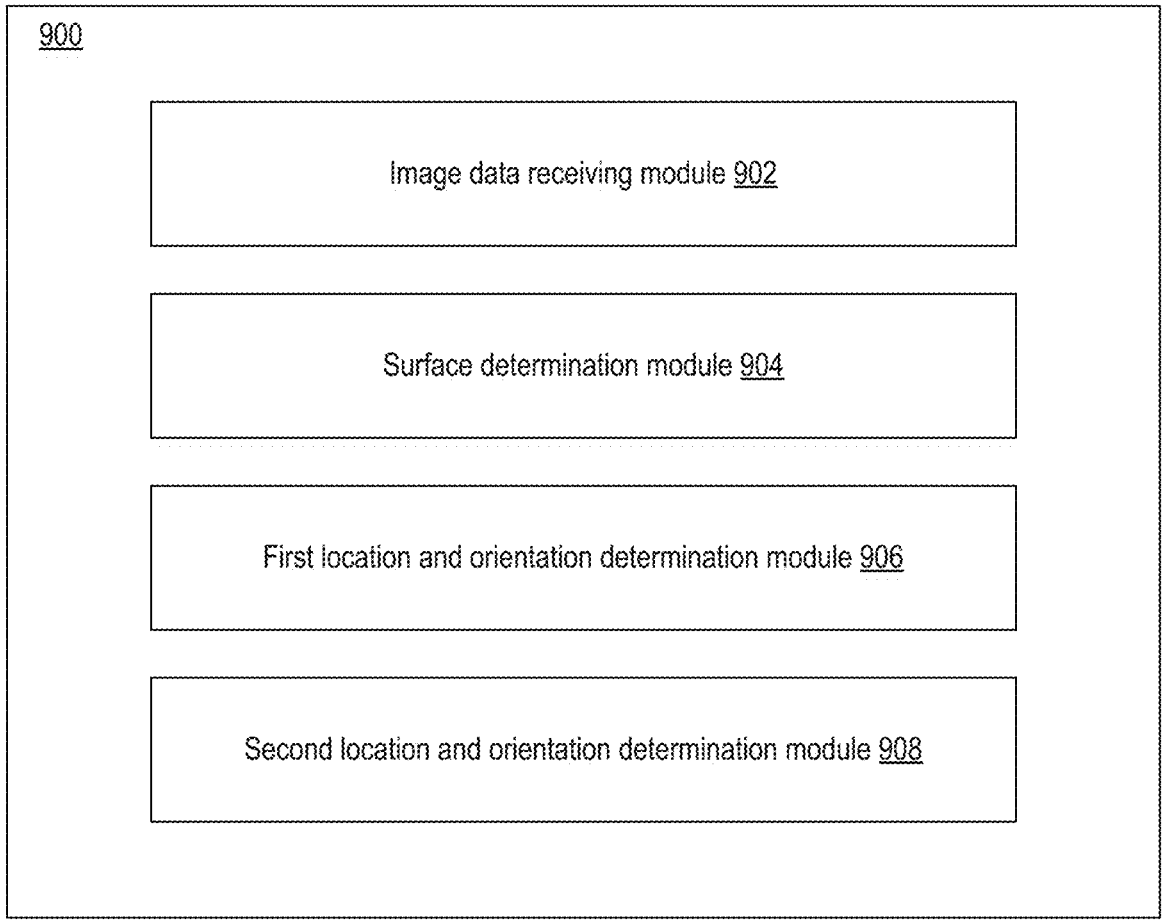
FIG. 9 is a schematic diagram of an exemplary system for determining a location and an orientation of a movable object based on image data, according to embodiments of the present disclosure.

Reference is now made to FIG. 9, which is a schematic block diagram of an exemplary system 900 for determining a location and an orientation of a movable object based on image data, according to embodiments of the present disclosure. As shown in FIG. 9, system 900 includes an image data receiving module 902, a surface determination module 904, a first location and orientation determination module 906, and a second location and orientation determination module 908.

In some embodiments, image data receiving module 902 can receive and store image data image data of a set of features on a surface. The image data can be captured by camera 150 of movable object 100 when it flies over the surface. The image data can also include stereo image data. In some embodiments, image data receiving module 902 is configured to perform at least a part of step 502 of FIG. 5.

In some embodiments, surface determination module 904 is configured to determine, based on the image data, whether the surface is uneven. If surface determination module 904 determines that the surface is even, it can provide the image data to first location and orientation determination module 906 to determine the location and orientation of the movable object. If surface determination module 904 determines that the surface is uneven, it can provide the image data to second location and orientation determination module 908 for location and orientation determination. In some embodiments, surface determination module 904 is configured to perform at least a part of step 504 of FIG. 5.

In some embodiments, first location and orientation determination module 906 may determine the orientation and location of the movable object based on invariant properties (e.g., affine invariance) of features captured in the image data. For example, first location and orientation determination module 906 may identify, for an extracted query feature from the image data, a set of neighboring points and their associated invariant ratios, and search for a reference feature in a database with identical ratios. After finding the reference feature, first location and orientation determination module 906 can then estimate a translation matrix and a rotation matrix based on the physical location of the reference feature and the location of the extracted feature in the image. If the set of features in the image data received by image data receiving module 902 are not associated with a set of markers, first location and orientation determination module 906 may perform image transformation (e.g., SIFT) to generate a set of query features and their associated ratios, and then search for matching reference features based on the ratios. In some embodiments, first location and orientation determination module 906 is configured to perform at least a part of steps 512 to 522 of FIG. 5.

In some embodiments, second location and orientation determination module 908 may determine the orientation and location of the movable object by generating a three-dimensional query point cloud to represent the set of features, and then estimate a translation matrix and a rotation matrix that matches the query point cloud with a reference point cloud. In some embodiments, second location and orientation determination module 908 is configured to perform at least a part of steps 508 and 510 of FIG. 5.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. It is to be understood that the examples and descriptions in this disclosure have been arbitrarily defined herein for the convenience of the description. The disclosed systems and methods are not limited to these simplified examples, and other features and characteristics may be considered so long as the specified functions are appropriately performed.

While certain disclosed embodiments have been discussed with respect to UAVs for purposes of discussion, one skilled in the art will appreciate the useful applications of disclosed methods and systems for identifying target objects. Furthermore, although aspects of the disclosed embodiments are described as being associated with data stored in memory and other tangible computer-readable storage mediums, one skilled in the art will appreciate that these aspects can be stored on and executed from many types of tangible computer-readable media. Further, certain processes and steps of the disclosed embodiments are described in a particular order, one skilled in the art will appreciate that practice of the disclosed embodiments are not so limited and could be accomplished in many ways. Accordingly, the disclosed embodiments are not limited to the above-described examples, but instead are defined by the appended claims in light of their full scope of equivalents.

What is claimed is:

1. A method of operating an aerial vehicle, comprising:
    acquiring, from one or more cameras attached to the aerial vehicle, one or more images of a surface comprising a plurality of points;
    calculating, based on locations of the plurality of points, one or more invariant properties in the one or more images;
    matching the one or more calculated invariant properties with one or more reference invariant properties associated with one or more predetermined features by uniquely identifying one or more hash indices associated with the one or more calculated invariant properties and the one or more reference invariant properties, wherein each predetermined feature is associated with a location;
    obtaining predetermined location information of the one or more predetermined features based on the one or more identified hash indices; and
    determining a location of the aerial vehicle and an orientation of the aerial vehicle based on the predetermined location information and the locations of the plurality of points.

2. The method of claim 1, wherein the one or more invariant properties include affine invariant ratios or perspective invariant ratios determined based on the locations of the plurality of points.

3. The method of claim 2, wherein calculating the one or more invariant properties in the one or more images comprises:
 extracting a query feature from one of the plurality of points;
 acquiring image locations of a set of points in the plurality of points associated with a set of neighboring features adjacent to the query feature in the one or more images; and
 determining a ratio based on geometric properties of the set of neighboring features;
 wherein the location of the aerial vehicle and the orientation of the aerial vehicle are determined based on a relationship between the determined ratio and the affine invariant ratios or the perspective invariant ratios associated with the set of predetermined features.

4. The method of claim 3, wherein the affine invariant ratios or the perspective invariant ratios are determined based on locations of one or more subsets of the set of neighboring features.

5. The method of claim 3, wherein the affine invariant ratios or the perspective invariant ratios are discretized and uniquely identified by hash indexes.

6. The method of claim 4, wherein the affine invariant ratios or the perspective invariant ratios are associated with ratios of areas of triangles formed by one of the one or more subsets of the set of neighboring features.

7. The method of claim 3, wherein the location of the aerial vehicle and the orientation of the aerial vehicle are further determined based on parameters of the one or more cameras including at least one of:
 focal length, scale factors, skew parameters, or principal point.

8. The method of claim 7, wherein determining the location of the aerial vehicle and the orientation of the aerial vehicle further comprises:
 determining a rotation matrix and a translation matrix.

9. The method of claim 8, wherein determining the location of the aerial vehicle and the orientation of the aerial vehicle further comprises:
 applying the rotation matrix and the translation matrix to physical locations of a second set of predetermined features to determine a re-projected image location; and
 determining a re-projection error based on the re-projected image location and a second image location of a second query feature.

10. The method of claim 9, further comprising:
 determining the re-projection error based on the re-projected image location in a first image and the second image location of the second query feature in a second image; and
 updating at least one of:
  the rotation matrix, the translation matrix, or the stored parameters of the cameras based on the re-projection error.

11. The method of claim 1, wherein the plurality of points are generated based on a set of markers randomly distributed on the surface.

12. The method of claim 1, wherein the plurality of points are associated with a set of feature descriptors that are invariant to location, scale, and rotation.

13. The method of claim 12, further comprising:
 performing a transformation of the one or more images to generate the set of feature descriptors.

14. The method of claim 1, further comprising:
 determining whether the surface is uneven; and
 responsive to determining that the surface is uneven:
  determining a reference three-dimensional point cloud representing a set of features on the surface, and
  determining a rotation matrix and a translation matrix that are configured to align the reference three-dimensional point cloud with a query three-dimensional point cloud;
  wherein the location of the aerial vehicle and the orientation of the aerial vehicle are determined based on the rotation matrix and the translation matrix.

15. The method of claim 1, further comprising:
 controlling at least one of:
  a speed or a direction of movement of the aerial vehicle based on the location of the aerial vehicle and the orientation of the aerial vehicle.

16. A system for operating an aerial vehicle, comprising:
 a memory storing executable instructions;
 one or more cameras; and
 at least one processor configured to execute the stored instructions to:
  acquire, from the one or more cameras, one or more images of a surface comprising a plurality of points;
  calculate, based on locations of the plurality of points, one or more invariant properties in the one or more images;
  match the one or more calculated invariant properties with one or more reference invariant properties associated with one or more predetermined features by uniquely identifying one or more hash indices associated with the one or more invariant properties and the one or more reference invariant properties, wherein each predetermined feature is associated with a location;
  obtain predetermined location information of the one or more predetermined features based on the one or more identified hash indices; and
  determine a location of the aerial vehicle and an orientation of the aerial vehicle based on the predetermined location information and the locations of the plurality of points.

17. An apparatus for operating an aerial vehicle, comprising:
 one or more cameras;
 an image data receiving module configured to acquire, from the one or more cameras, one or more images of a surface comprising a plurality of points;
 a surface determination module configured to determine whether the surface is uneven; and
 a first location and orientation determination module configured to perform a first operation based on a determination by the surface determination module that the surface is even, the first operation comprising:
  calculating, based on locations of the plurality of points, one or more invariant properties in the one or more images;
  matching the one or more calculated invariant properties with one or more reference invariant properties associated with one or more predetermined features by uniquely identifying one or more hash indices associated with the one or more calculated invariant properties and the one or more reference invariant properties, wherein each predetermined feature is associated with a location;

obtaining predetermined location information of the one or more predetermined features based on the one or more identified hash indices; and determining a location of the aerial vehicle and an orientation of the aerial vehicle based on the predetermined location information and the locations of the plurality of points.

18. The apparatus of claim 17, further comprising:
a second location and orientation determination module configured to perform a second operation based on a determination by the surface determination module that the surface is uneven, the second operation comprising:
   determining a reference three-dimensional point cloud representing a set of features on the surface; and
   determining a rotation matrix and a translation matrix that are configured to align the reference three-dimensional point cloud with a query three-dimensional point cloud,
wherein the location of the aerial vehicle and the orientation of the aerial vehicle are determined based on the rotation matrix and the translation matrix.

19. The apparatus of claim 17, wherein the apparatus is included in a movable object.

20. The apparatus of claim 17, wherein the apparatus is included in the aerial vehicle.

* * * * *